US012227009B2

(12) United States Patent
Dahlmann et al.

(10) Patent No.: US 12,227,009 B2
(45) Date of Patent: Feb. 18, 2025

(54) PRINTER FOR PRINTING PLATE-LIKE PRINT MEDIA, CLEANING DEVICE FOR THE PRINTER AND METHOD FOR SERVICING THE PRINTER

(71) Applicant: Weidmüller Interface GmbH & Co. KG, Detmold (DE)

(72) Inventors: Markus Dahlmann, Rheda-Wiedenbrück (DE); Thorsten Bornefeld, Schlangen (DE); Rico Schindler, Porta Westfalica (DE); René Manke, Bielefeld (DE); Thomas Köster, Schlangen (DE)

(73) Assignee: Weidmüller Interface GmbH & Co. KG (DE)

( * ) Notice: Subject to any disclaimer, the term of this patent is extended or adjusted under 35 U.S.C. 154(b) by 0 days.

(21) Appl. No.: 17/626,190

(22) PCT Filed: Jul. 8, 2020

(86) PCT No.: PCT/EP2020/069201
§ 371 (c)(1),
(2) Date: Jan. 11, 2022

(87) PCT Pub. No.: WO2021/008955
PCT Pub. Date: Jan. 21, 2021

(65) Prior Publication Data

US 2022/0242127 A1 Aug. 4, 2022

(30) Foreign Application Priority Data

Jul. 12, 2019 (DE) ......................... 102019118989.6

(51) Int. Cl.
*B41J 2/165* (2006.01)
*B41J 3/407* (2006.01)

(52) U.S. Cl.
CPC ........... *B41J 2/16508* (2013.01); *B41J 3/407* (2013.01); *B41J 2002/16594* (2013.01)

(58) Field of Classification Search
None
See application file for complete search history.

(56) References Cited

U.S. PATENT DOCUMENTS 5,559,538 A 9/1996 Nguyen et al.
5,606,354 A * 2/1997 Bekki .................. B41J 2/16547 D18/56

(Continued)

FOREIGN PATENT DOCUMENTS

CN 102371766 A 3/2012
DE 69517880 T2 3/2001

(Continued)

*Primary Examiner* — Alejandro Valencia
(74) *Attorney, Agent, or Firm* — LAUBSCHER & FRETWELL, P.C.

(57) ABSTRACT

A printer for printing plate-like print media includes a printing unit having at least one print head for printing print media according to the inkjet printing. The printing unit is movable in and against a conveying direction. A cleaning unit is provided for cleaning the print unit and includes a cleaning device for suctioning ink out of the print head in a suctioning direction. The cleaning unit further includes a drive device for moving the cleaning device in different operating positions. A cleaning device for such a printer and a method for maintaining the printer are also provided.

12 Claims, 19 Drawing Sheets

(56) References Cited

U.S. PATENT DOCUMENTS

| | | | | |
|---|---|---|---|---|
| 5,745,134 | A * | 4/1998 | Hirabayashi | B41J 2/16523 347/23 |
| 6,151,044 | A * | 11/2000 | Gaasch | B41J 2/16538 347/33 |
| 6,224,186 | B1 * | 5/2001 | Johnson | B41J 2/16552 347/33 |
| 6,629,750 | B2 | 10/2003 | Ciordia | |
| 9,421,797 | B2 | 8/2016 | Speith et al. | |
| 10,131,149 | B2 | 11/2018 | Reder et al. | |
| 2001/0012027 | A1 | 8/2001 | Murcia et al. | |
| 2004/0246294 | A1 | 12/2004 | Mitsuzawa | |
| 2007/0188545 | A1 | 8/2007 | Miyamoto | |
| 2009/0303284 | A1 | 12/2009 | Muhl et al. | |
| 2012/0026241 | A1 | 2/2012 | Gaston et al. | |
| 2012/0038706 | A1 | 2/2012 | Izawa et al. | |
| 2014/0168323 | A1 * | 6/2014 | Ishida | B41J 29/13 347/86 |
| 2015/0217582 | A1 | 8/2015 | Speith et al. | |

FOREIGN PATENT DOCUMENTS

| | | | |
|---|---|---|---|
| DE | 60300422 | T2 | 3/2006 |
| DE | 202006005458 | U1 | 8/2007 |
| DE | 202008007604 | U1 | 8/2008 |
| DE | 602006000993 | T2 | 5/2009 |
| DE | 102011002727 | A1 | 7/2012 |
| DE | 202012101998 | U1 | 9/2013 |
| DE | 102015215723 | A1 | 2/2017 |
| EP | 1101616 | A1 | 5/2002 |
| EP | 1310367 | A1 | 5/2003 |

* cited by examiner

PRINTER FOR PRINTING PLATE-LIKE PRINT MEDIA, CLEANING DEVICE FOR THE PRINTER AND METHOD FOR SERVICING THE PRINTER

This application is a § 371 National Stage Entry of PCT/EP2020/069201 filed Jul. 8, 2020. PCT/EP2020/069201 claims priority of DE 10 2019 118 989.6 filed Jul. 12, 2019. The entire content of these applications is incorporated herein by reference.

BACKGROUND OF THE INVENTION

The present invention relates to a printer for printing plate-like print media and includes a printing unit with at least one print head for printing the print media in accordance via inkjet printing. The printing unit is movable in and against a conveying direction. A cleaning unit for cleaning the printing unit includes a cleansing device for extracting ink in an extraction direction from the print head. The present invention furthermore relates to a cleansing device and to a method for servicing the printer.

A printer and plate-like print media provided for marking electrical appliances, connectors, cables or the like are known from DE 20 2006 005 458 U1. The plate-like print media are configured as cards or as markers and are combined into a mat. They are provided with imprints while passing through the printer. The printer has a print head or printing mechanism for printing the print media.

DE 20 2012 101 998 U1 also discloses such a printer for plate-like print media. The printer includes a separating apparatus for separating the print media from a stack.

To clean the printing unit, a cleaning unit for the print head is provided in such printers.

Printers have proven their value in practice. However, due to the high demand for such printed print media in industrial production and their resulting output, there is regularly a demand for servicing such printers.

SUMMARY OF THE INVENTION

The present invention relates to a printer for a plate-like printing medium and a cleaning unit for the printer so that the printer can be serviced quickly and simply with minimal servicing outlay.

More particularly, the printer was developed for printing print media such as marker cards which include one or more markers for marking electrical appliances, connectors, cables or the like. The printer has a printing unit with at least one print head for printing the print media via inkjet printing. The printing unit is movable in and against a conveying direction. Furthermore, it includes a cleaning unit for cleaning the printing unit. The cleaning unit includes a cleansing device for extracting ink in an extraction direction from the print head.

The cleaning unit additionally includes a driving device for moving the cleansing device into various operating positions.

The printer is advantageously distinguished by the cleansing device being able to be moved by the driving device into a servicing position in which it can be completely removed from the printer. This can be realized in a variety of ways. As a result, the cleansing device can be cleaned outside the printer or can be partially or completely replaced. The cleaning of the cleansing device is thus substantially simplified and accelerated.

In order to be able to move the cleansing device in the printer, the cleansing device preferably includes a frame on which one or more tooth sections—preferably configured similarly to or realized as a rack on the frame is arranged. The tooth sections mesh with an output pinion of the driving device so that they can be moved when the driving device is actuated. To remove the cleansing device in the servicing position, the tooth sections and the output pinions are disengaged. The cleansing device can therefore be removed simply from the printer in the servicing position.

For this purpose, the tooth sections preferably extend in a linear direction, particularly in the extraction direction. However, depending on the spatial conditions, the tooth sections may also have a different profile and may run in an arc shape, for example, so that the cleansing device is moved through a non-circular path into the servicing position.

A pair of tooth sections which are spaced apart from one another in a third spatial direction is assigned to a pair of output pinions which are spaced apart from one another in the third spatial direction. As a result, the forces required to move the cleansing device are uniformly distributed to both output pinions, and the cleansing device does not tilt during movement.

Furthermore, it is preferred that the printing unit, to move the cleansing device into the servicing position in relation to the cleaning unit, can be moved counter to the conveying direction in such a way that it is spaced from the cleaning unit counter to the conveying direction. As a result, the printing unit does not impede the removal of the cleansing device.

In a preferred embodiment, the cleansing device includes a wiping blade or lip for wiping the ink from the print head and/or a suction cup for extracting ink from the print head. The print head can repeatedly be cleaned quickly with the wiping lip and/or the suction cup until the cleansing device has to be removed from the printer depending on wear and use in order to extensively service and/or replace it. It is preferable that the wiping lip and/or the suction cup are movable with the cleansing device in order to be able to service or replace it/them.

For this purpose, the wiping lip and/or the suction cup are preferably arranged on a mounting plate which is affixed to the frame and which extends transversely to this frame.

In addition, it is preferred that the cleansing device includes a pump which is assigned to the suction cup and which is intended for extracting the ink from the print head. The pump is also preferably movable with the cleansing device in order to be able to service or replace it at the same time as the cleansing device.

The cleaning unit also includes a collecting device with a collecting container for the ink. Since the collecting container has to be emptied regularly, it is preferable that the collecting device is not movable with the cleansing device but rather is separately removable from the printer when the cleansing device is in an exchanging position.

Furthermore, the cleaning unit preferably includes a cleaning device for the wiping lip. This is preferably arranged on the collecting container. As a result, it can be removed from the printer together with the collecting container and cleaned.

The cleaning device for the wiping lip preferably includes a sponge in which there is arranged a receptacle into which the wiping lip can be reversibly introduced by moving the cleansing device. After removal of the collecting container, the sponge can be removed and washed out or exchanged.

In order to clean the wiping lip, the sponge is preferably arranged between two adjustable walls. Spacing of the walls in relation to one another changes upon introduction of the wiping lip, such that the sponge is compressed. For this purpose, the walls preferably have a ramp-shaped contour that interacts with the mounting plate when the cleansing unit moves. Due to the ramp-shaped contour, the walls are pressed closer and closer together when the cleansing unit is moving, while at the same time the lip is introduced further into the receptacle. As a result, a very good wiping result is obtained. Furthermore, the sponge is well protected during in and out movement.

Another object of the invention is to provide a cleansing device for such a printer. The cleansing unit is completely removable from the printer so that it can be serviced very easily and quickly.

A further object of the invention is to provide a method for servicing a printer, in particular a printer in which a cleansing device is initially moved into a servicing position and then completely removed from the printer. As a result, the components of the cleaning device which are to be serviced depending on wear and use can be checked very easily and, if necessary, exchanged.

BRIEF DESCRIPTION OF THE FIGURES

The invention will be described below with the reference to accompanying figures in which:

FIG. 14 is a schematic view of a printer according to the prior art for printing plate-like print media such as case marker cards marking electrical appliances, connectors, cables or the like.

DETAILED DESCRIPTION

Figure 14:
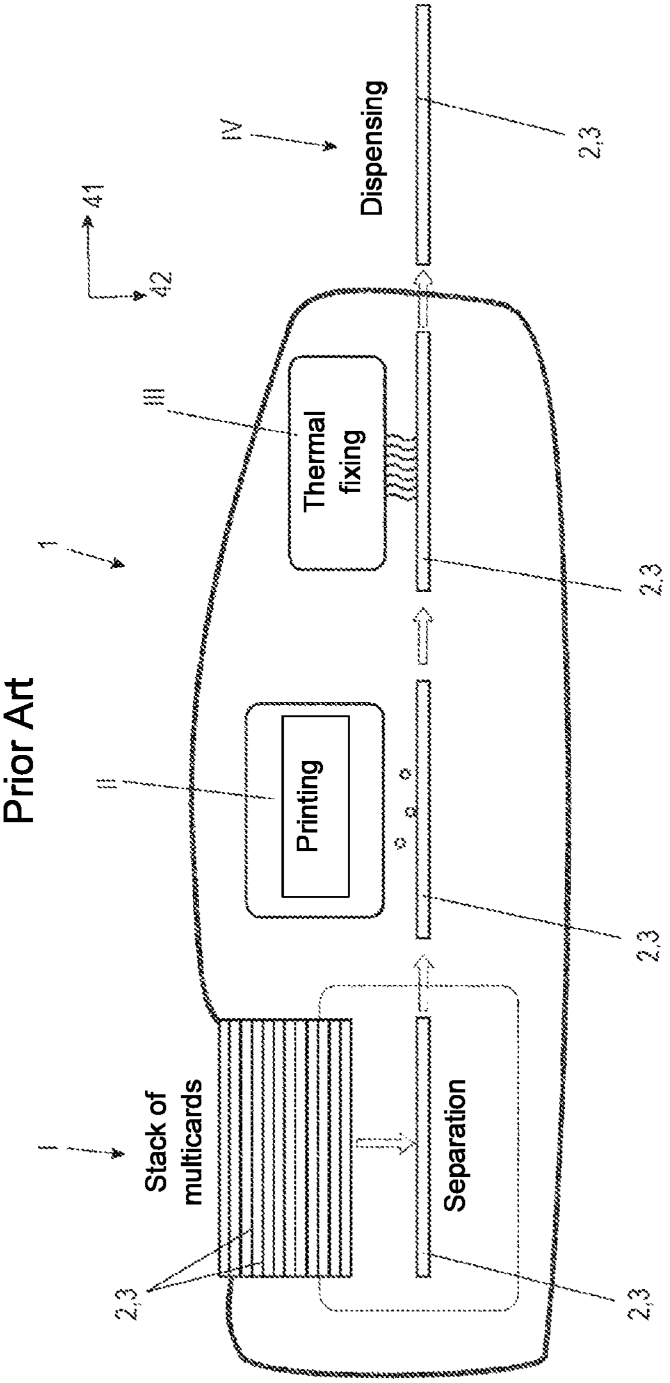
Fig. 14 Prior Art

Referring first to FIG. 14, there is shown a printer 1 according to document DE 20 2006 005 458 U1 for printing plate-like print media such as marker cards 2 with markers 3 for marking electrical appliances, connectors, cables or the like. Each marker card 2 is conveyed in a conveying direction 41 through the printer 1 without changing direction. The printer 1 has several functional apparatuses I, II, III, IV for printing the marker cards 2.

The first functional apparatus I is a separating apparatus which includes a magazine for receiving the marker cards 2. The marker cards 2, which are stacked in the magazine, are separated in the separating apparatus I. They are then fed to the second functional apparatus II which is a printing apparatus and printed. In the third functional apparatus Ill configured as a fixing apparatus, the printed image printed on the marker card 2 is fixed. With the fourth functional apparatus IV which is a dispensing apparatus, the marker card 2 is then dispensed. The dispensing apparatus may optionally include a cooling zone.

Such printers 1 function in accordance with the inkjet principle. Their printing apparatus II has a printing unit 100 with at least one print head 104, 105. Ink is applied by the print head 104, 105 onto an area 20 to be printed of the plate-like printing medium 2.

Figure 12:
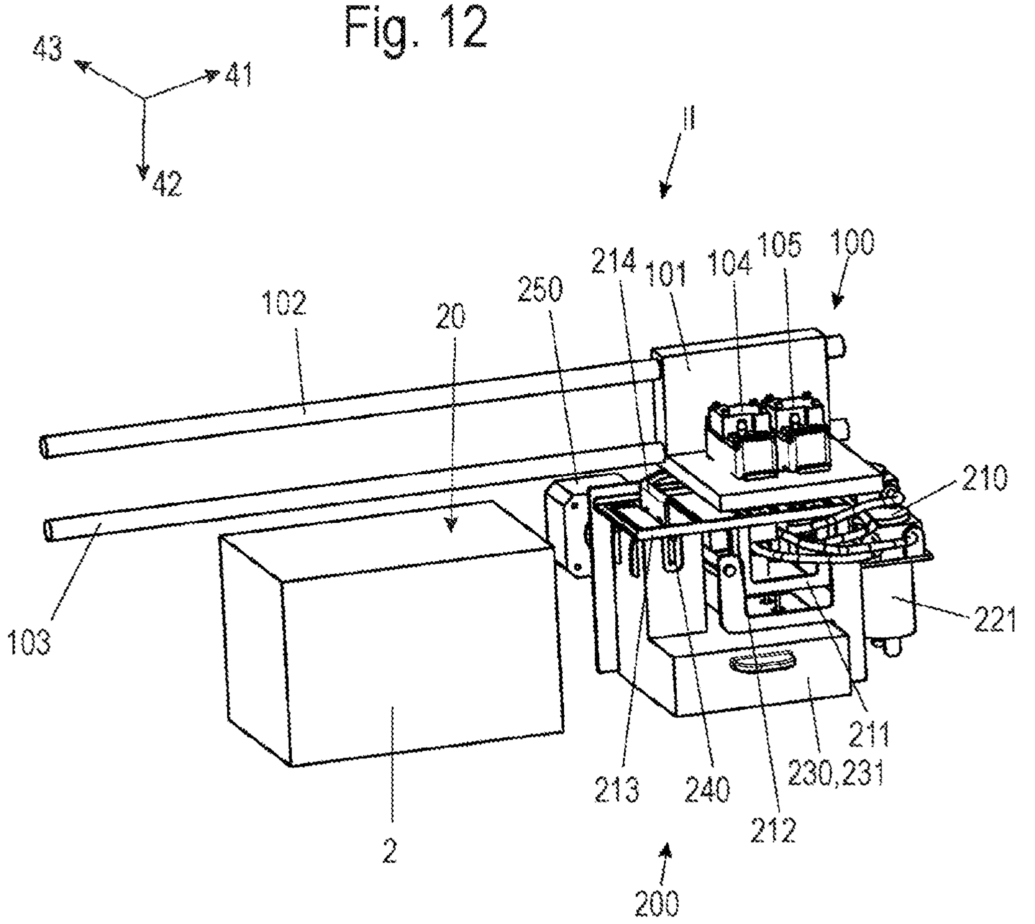
FIG. 12 is a perspective view of the printer of FIG. 1 with a plate-like printing medium.

FIG. 12 shows a printing apparatus II of a printer 1 according to the invention in a perspective view. The printing unit 100 has two print heads 104, 105 to provide two differently colored inks for example. Depending on the number of print colors desired, such a printer 1 can also have more print heads 104, 105.

A marker card 2 having an area 20 to be printed is shown diagrammatically in order to illustrate the position of the marker card 2 during printing. The area 20 to be printed faces the two print heads 104, 105.

The print heads 104, 105 are arranged on a print-head carrier 101 and can be moved with the carrier along two guide rails 102, 103 in and counter to the conveying direction 41. They are affixed to the print-head carrier 101 beside one another in the conveying direction 41. A print-head drive mechanism for moving the print-head carrier 101 in and counter to the conveying direction 41 is not shown.

The guide rails 102, 103 are arranged spaced apart from one another in an emission direction 4, which extends transverse to the conveying direction 41 and are oriented parallel to one another. In the depicted embodiment, the emission direction 42 is a vertical direction and the conveying direction 41 is a horizontal direction. Therefore, the terms vertical direction and emission direction 42, as well as horizontal direction and conveying direction 41, respectively, will be used synonymously below.

In order to clean the print heads 104, 105, the printing apparatus II has a cleaning unit 200. This includes a cleansing device 210 with which ink can be extracted from each of the print heads 104, 105, and a collecting device 230 which includes a collecting container 231 for the ink.

FIG. 12 depicts the print-head carrier 101 in a cleaning position of the printer 1 in which the print-head carrier 101 is arranged above the cleaning unit 200. The cleaning position will be explained in greater detail below in connection with the description of FIG. 1.

The cleaning unit 200 furthermore has a driving device 250 for driving a frame 211 of the cleansing device 210. With the driving device 250, the frame 211 is displaceable in and counter to the vertical direction 42 relative to the printing unit 100. For this purpose, tooth sections 212*a*-212*d* are provided on the frame 211 as gear elements. The driving device 250 will be explained in greater detail below in connection with the description of FIGS. 7 and 8.

The cleansing device 210 additionally includes a mounting plate 213 which is arranged on the frame 211 and on which one suction cup 215, 216 is arranged for each print head 104, 105, respectively. The suction cups 215, 216 are arranged beside one another in the conveying direction 41 and are spaced apart from one another by the same distance as the print heads 104, 105. In the cleaning position R, they are therefore currently positioned in such a way that they are arranged below the print heads 104, 105.

Furthermore, a wiping blade or lip 214 for wiping the ink from the print heads 104, 105 is arranged on the mounting plate 213. In order to clean the wiping lip, the cleaning unit also includes a cleaning device 240 for the wiping lip 214.

Figure 1:
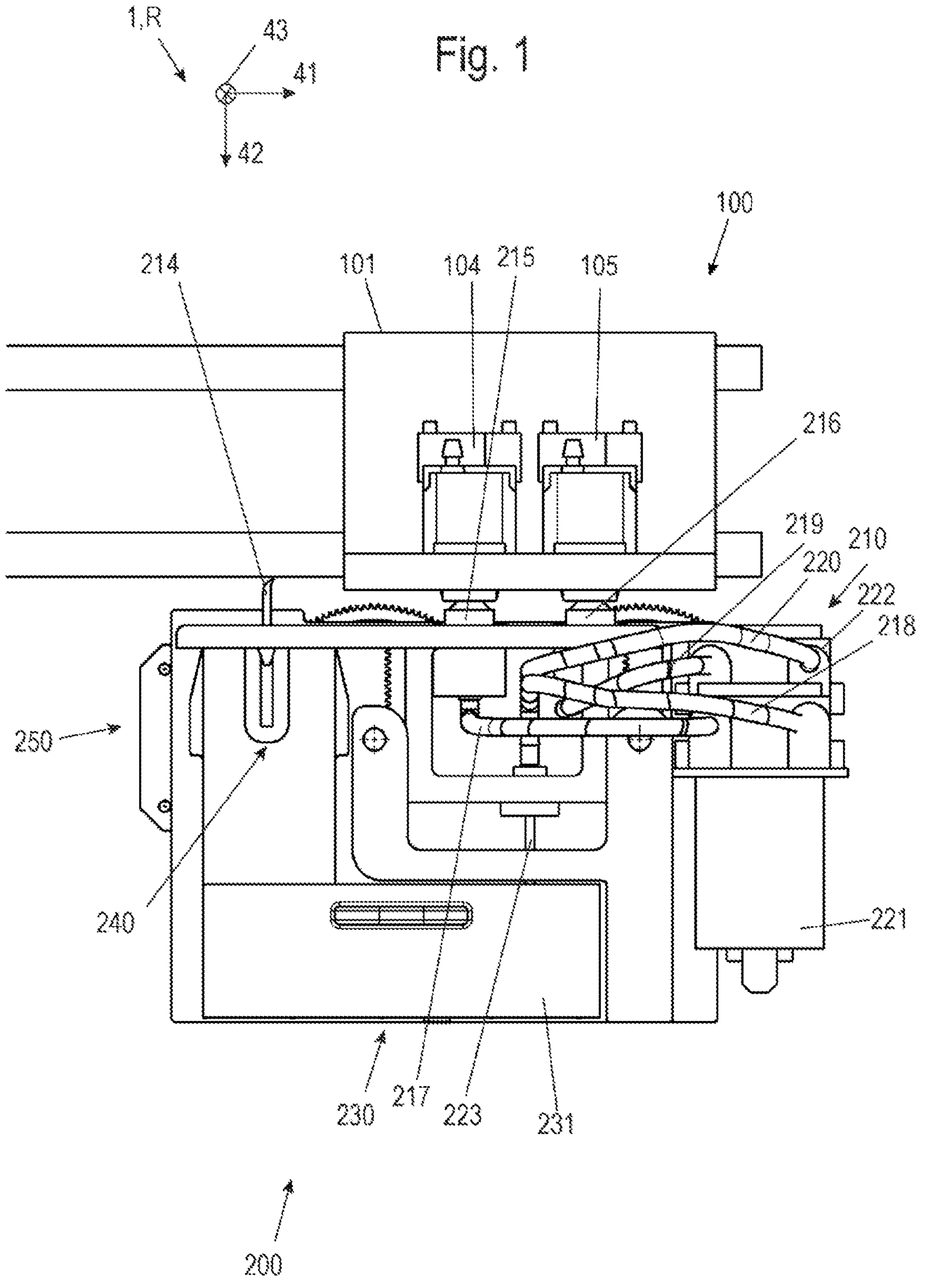
FIG. 1 is a front view of a printer according to the invention, with a printing unit and a cleaning unit for a print head of the printer in a cleaning position.

FIG. 1 depicts the printing unit 100 in the cleaning position R. A first suction cup 215 and a second suction cup 216 are arranged on the mounting plate 213. In the cleaning position R, the print heads 104, 105 are positioned in the horizontal direction corresponding to the suction cups 215, 216 and above them. Furthermore, the cleansing device 210 is moved vertically upwards so that the suction cups 215, 216 fit closely against a nozzle side (not shown) of the print heads 104, 105.

Figure 9:
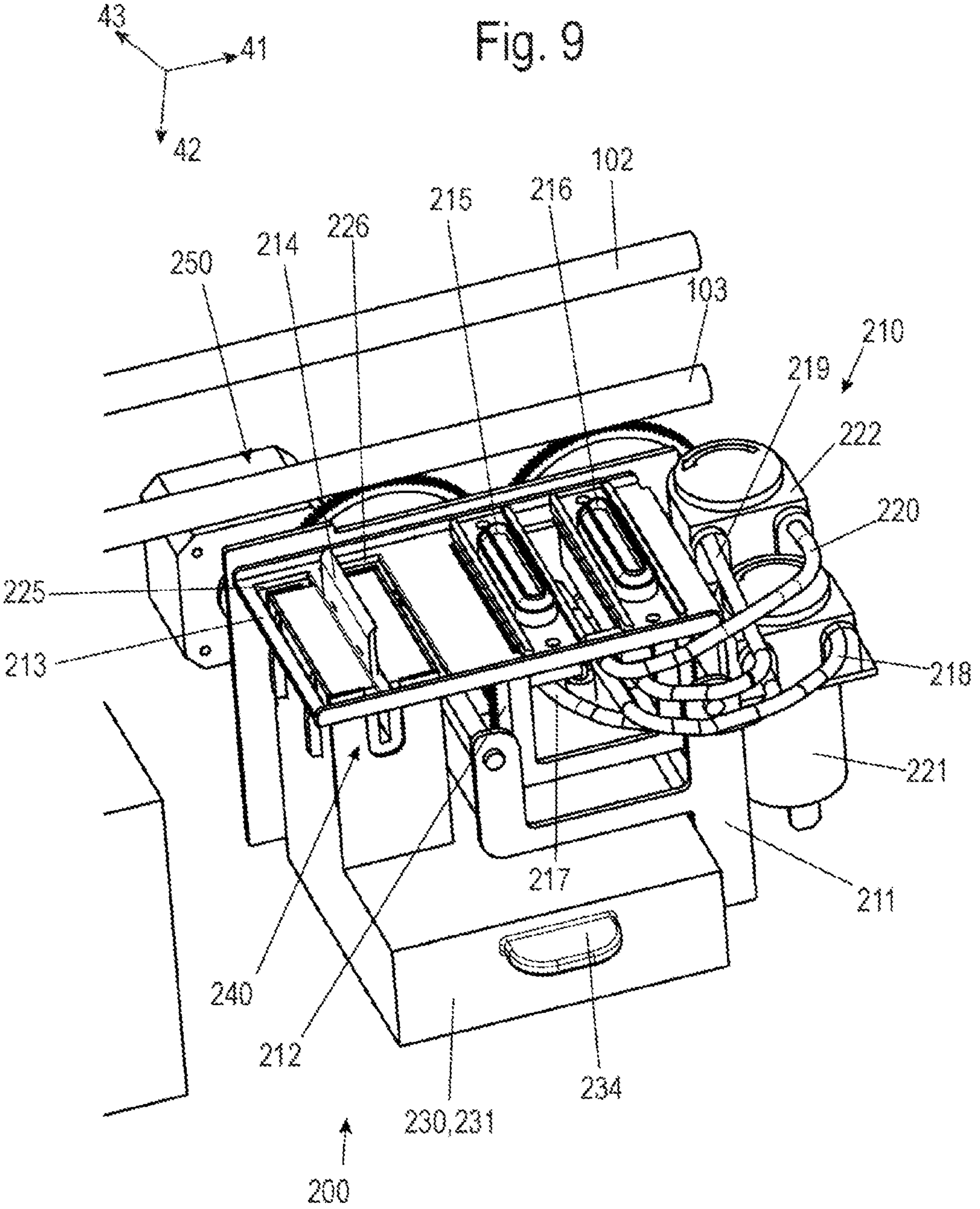
FIG. 9 is a perspective view of the cleansing device of FIGS. 6 and 7.
Figure 11:
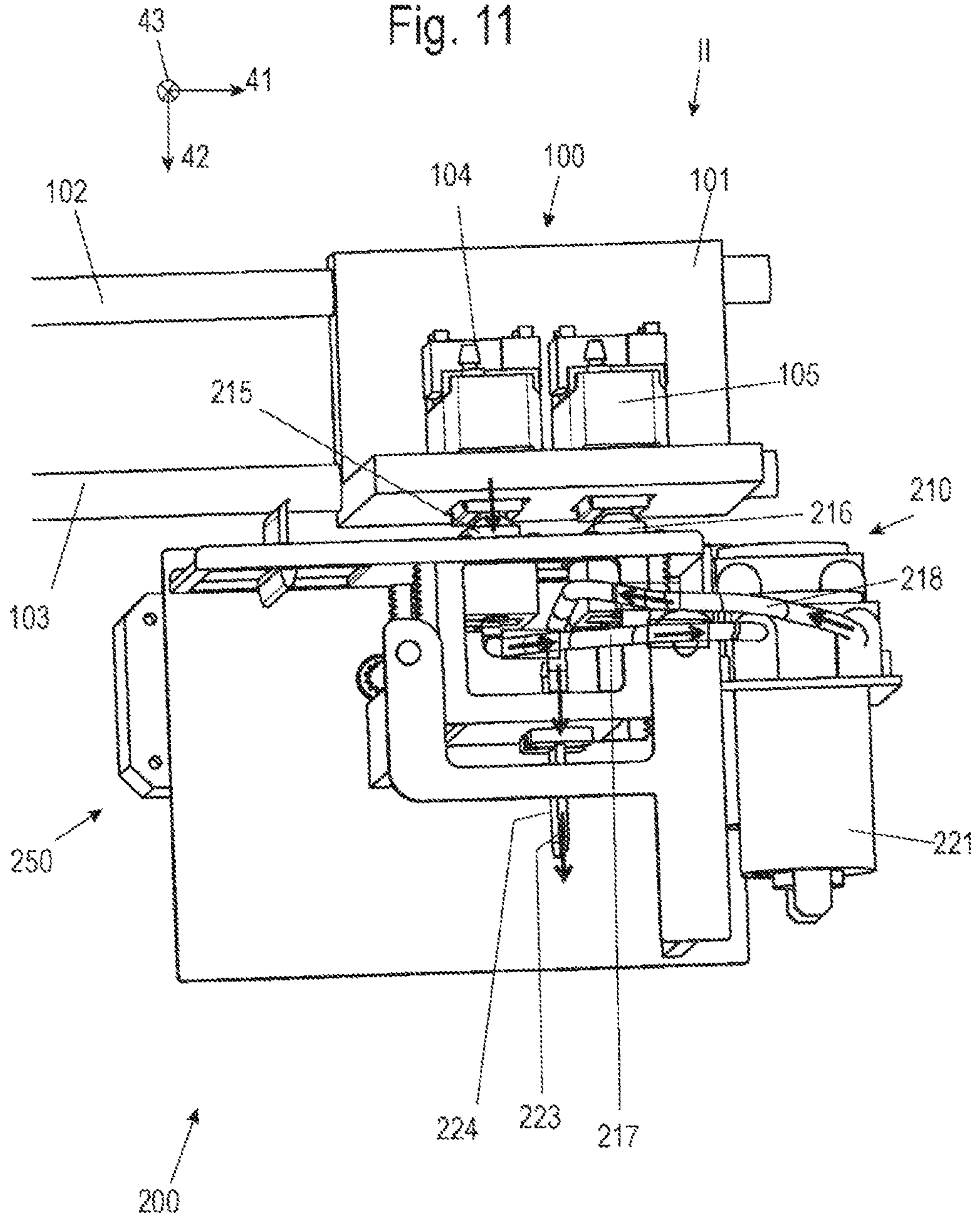
FIG. 11 is a partial perspective view of the printer of FIG. 1 without the collecting device.

For this purpose, the suction cups 215, 216 are connected via a first pipe 217, 219, respectively, to a pump with which the ink can be extracted from the print heads 104, 105. Each of the pumps 221, 222 is connected via a second pipe 218, 220, respectively, to the collecting container 231 of the collecting device 230 by one free pipe end 223, 224 of the second pipe 218, 220 being introduced into the collecting container 213. The excess ink is collected in the collecting container 231 of the collecting device 230. The pipes 217, 218 and 219, 220 are preferably formed from elastic hoses, so that they are deformable (as also shown in FIG. 11 and FIG. 9). During extraction, the nozzle side of the print heads 104, 105 is sealed off from the surrounding atmosphere by the suction cups 215, 216.

The pumps 221, 222 extract excess ink by the suction cup 215, 216 attached to them from the print head 104, 105 against which each suction cup 215, 216 abuts, respectively. Since one pump 221, 222 and one suction cup 215, 216 is assigned to each print head 104, 105, extraction can take place in a single step. The excess ink is conveyed by the pumps 221, 222 into the collecting container 231 of the collecting device 230.

The pumps 221, 222 are affixed to the frame 211 of the cleaning unit 210 so that they can be moved together with the cleansing device 210 by the driving device 250. As a result, they can be serviced or exchanged together with the cleaning unit 210.

The printing unit 100 and the cleansing device 210 are always in the cleaning position when the printer is in a "stand-by" operating mode, i.e. is ready to operate, but currently has no printing task to perform or is switched off. In this way, the print heads can become sealed and potential ink residues do not dry and the print heads do not clog.

Figure 2:
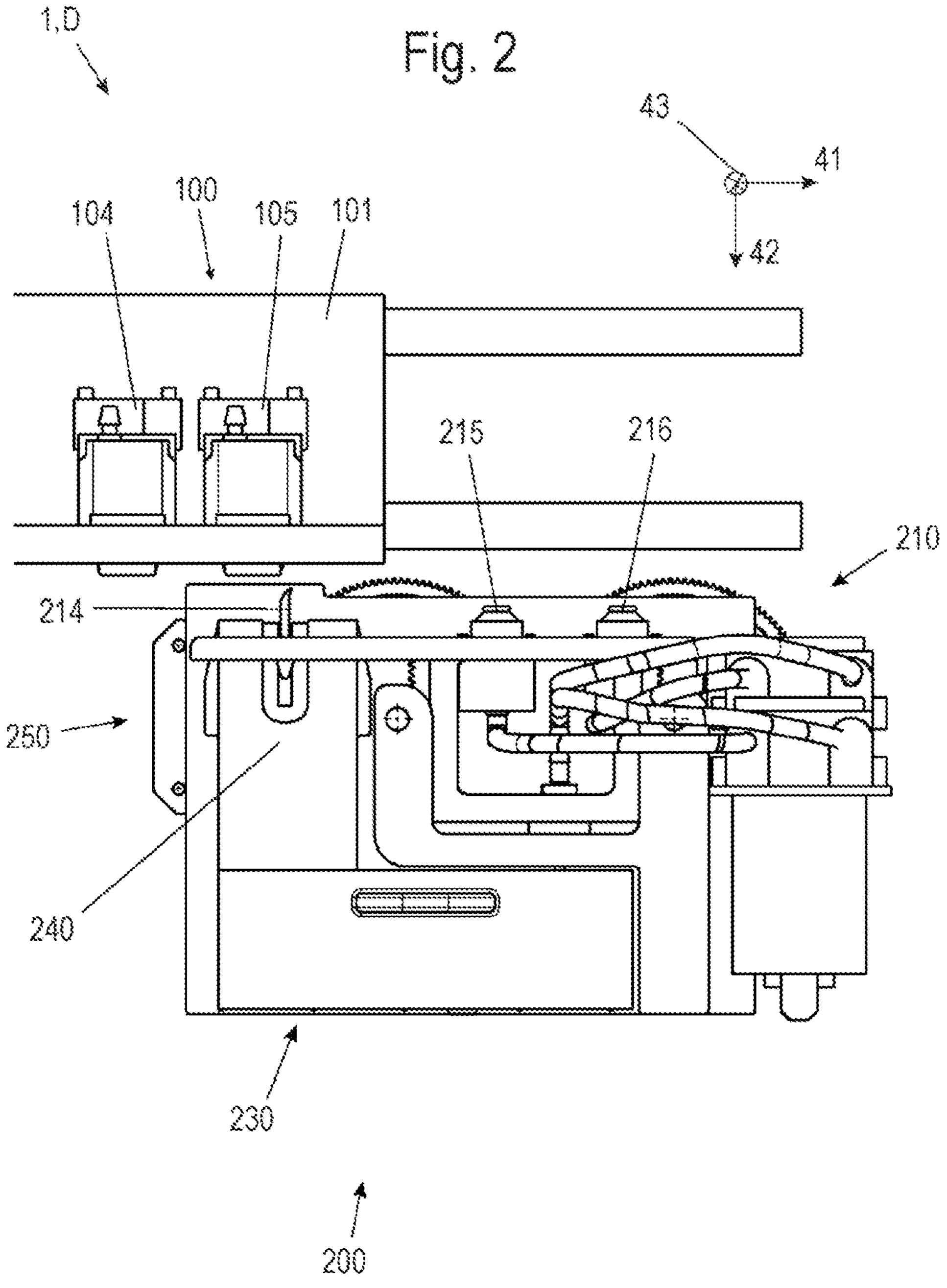
FIG. 2 is a side view of the printer of FIG. 1 in a printing position.

FIG. 2 depicts the printing unit 100 as freely movable. The printer 1 is therefore in a printing position D. "Freely" here means that the cleansing unit 210 is located below the print heads 104, 105, in the vertical direction 42, to such an extent that the printing unit 100 above the cleansing unit 210 is movable in and counter to the horizontal direction 41 without touching it.

Figure 3:
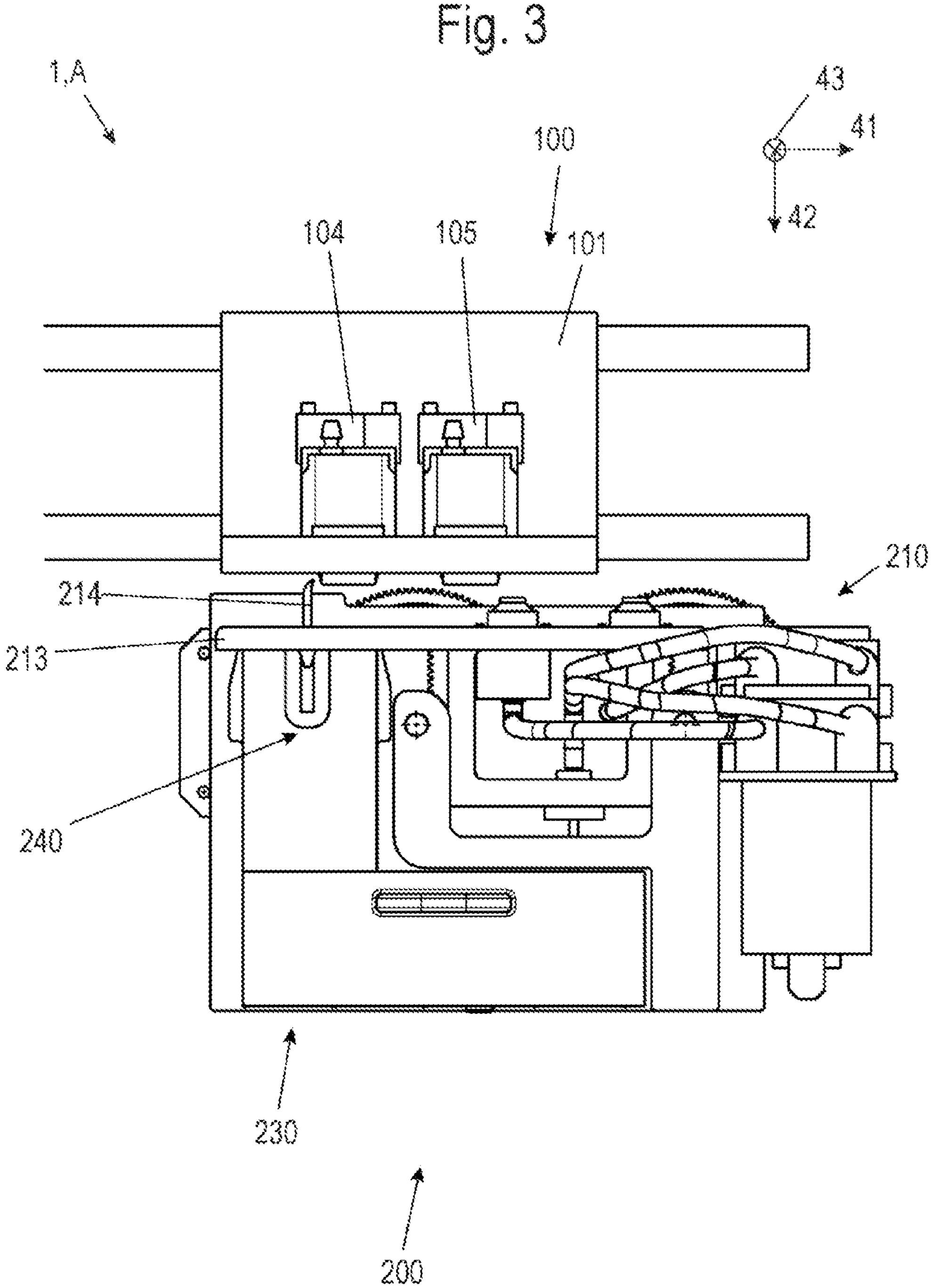
FIG. 3 is a side view of the printer of FIG. 1 in a wiping position.

In FIG. 3, the printer is located in a wiping position A, in which, when the printing unit 100 is moving, ink can be wiped away from the print heads 104, 105 by the wiping lip 214. For this purpose, the wiping lip 214 is affixed to the mounting plate 213 such that its free end extends out upwardly from the mounting plate 213 counter to the vertical direction 42. Furthermore, the cleansing device 210 is moved counter to the vertical direction 42 to such an extent that a free end (not shown) of the wiping lip 214 touches a nozzle side (not shown) of one of the print heads 104, 105. The printing unit 100 is then moved in the horizontal direction over the wiping lip 214 with the excess ink being wiped by the wiping lip 214 off the nozzle side of that print head 104, 105 along which it is currently being moved. This preferably takes place at pre-set time intervals. After wiping of the excess ink has taken place, the wiping lip 214 is regularly cleaned.

Figure 4:
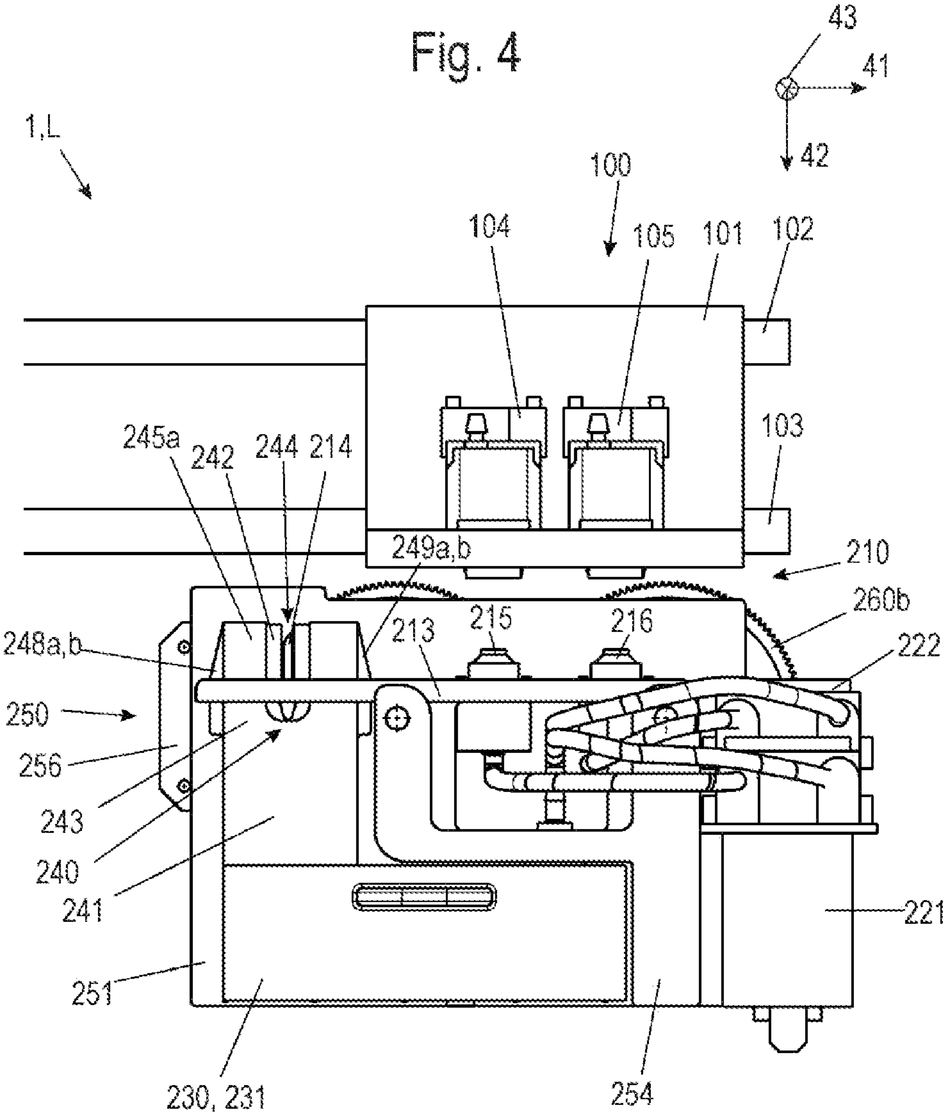
FIG. 4 is a side view of the printer of FIG. 1 in a lip-cleaning position.

Cleaning of the wiping lip 214 is shown in FIG. 4 and in FIGS. 13*a*-13*d*.

In addition to the collecting container 231 for the excess ink, the collecting device 230 has a cleaning device 240 for the wiping lip 214. The cleaning device 240 is arranged on the collecting container 231. It has a sponge 242 in which a receptacle 244 for the wiping lip 214 is arranged. On both sides of the sponge 242, there are provided adjustable walls 246*a*, 246*b* which each have a ramp-like contour and which are formed by ribs 248*a*, 248*b*, 249*a*, and 249*b*. The walls 246*a*, 246*b* are adjustable in or counter to the horizontal direction 41 by applying pressure on the ribs 248*a*, 248*b*, 249*a*, and 249*b* with the sponge 242 being compressed by the walls 246*a*, 246*b*.

In order to clean the wiping lip 214 with the aid of the cleaning device 240, the cleansing device 210 moves downwardly in the vertical direction 42. The mounting plate 213 is moved downwardly together with the cleansing device 210.

The cleaning device 240 is arranged on that side of the collecting container 231 which faces the mounting plate 213 and is raised compared to the collecting container 231. In the horizontal direction 41, the mounting plate 213 additionally has openings 225, 226 on both sides of the wiping lip 214. Furthermore, the wiping lip 214 is arranged in a lip-cleaning position L from which it can be retracted for cleaning above the receptacle 244 of the sponge 242.

Therefore, when moving in the vertical direction 42, the wiping lip dips into the receptacle 244, wherein the sponge 242 and the walls 246*a*, 246*b* which surround it dip into the openings 225, 226 of the mounting plate 213. Since the ribs 248*a*, 248*b*, 249*a*, and 249*b* are configured in a ramp shape, the walls 246*a*, 246*b* are pressed closer and closer together. As a result, the sponge 242 is compressed further and further. This process is shown in FIGS. 13 *a*-13*d*.

Figure 13A:
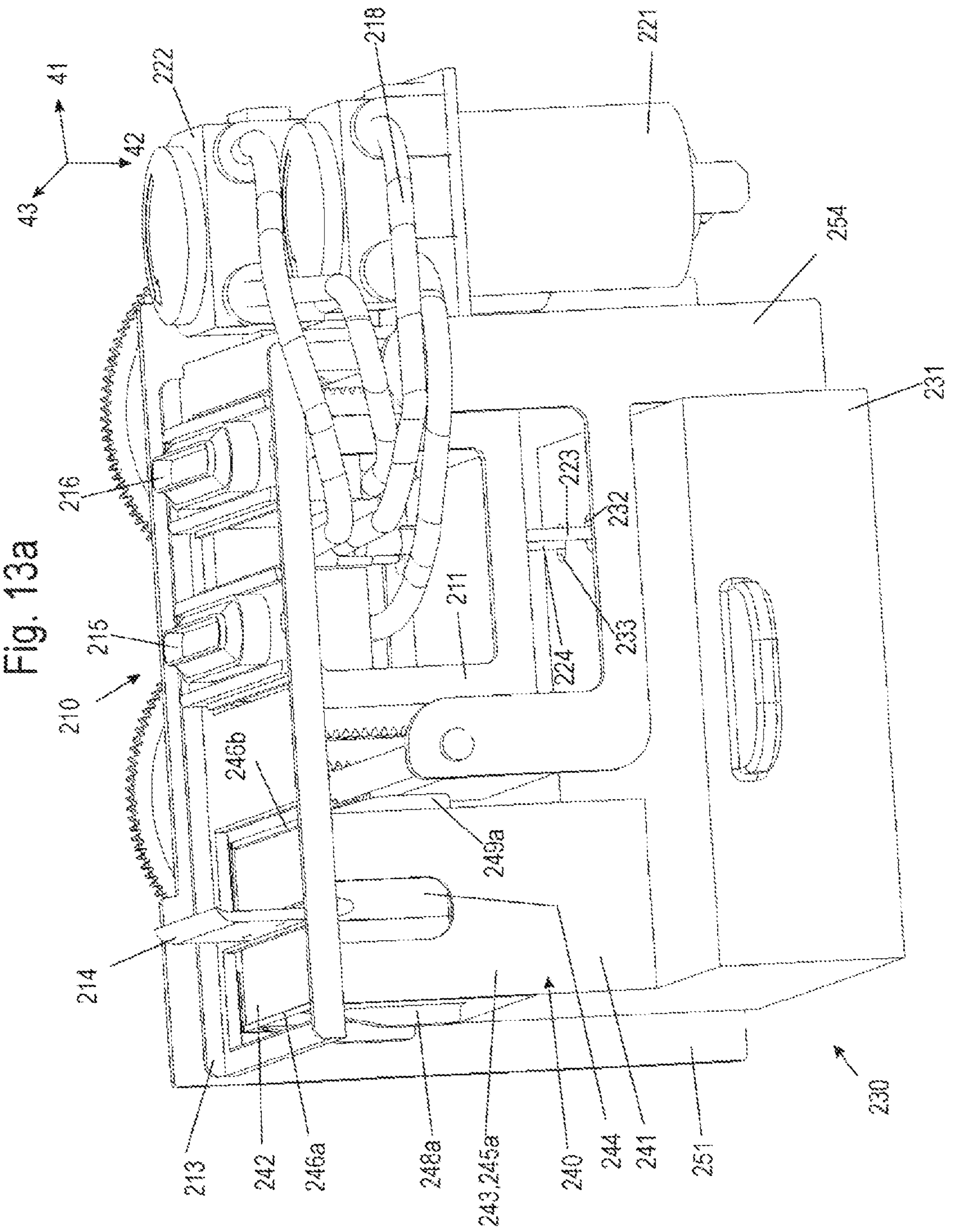
FIGS. 13*a*-13*d* are perspective views of the cleaning unit with the cleansing device progressively moved to different distances from the collecting device, respectively.
Figure 13B:
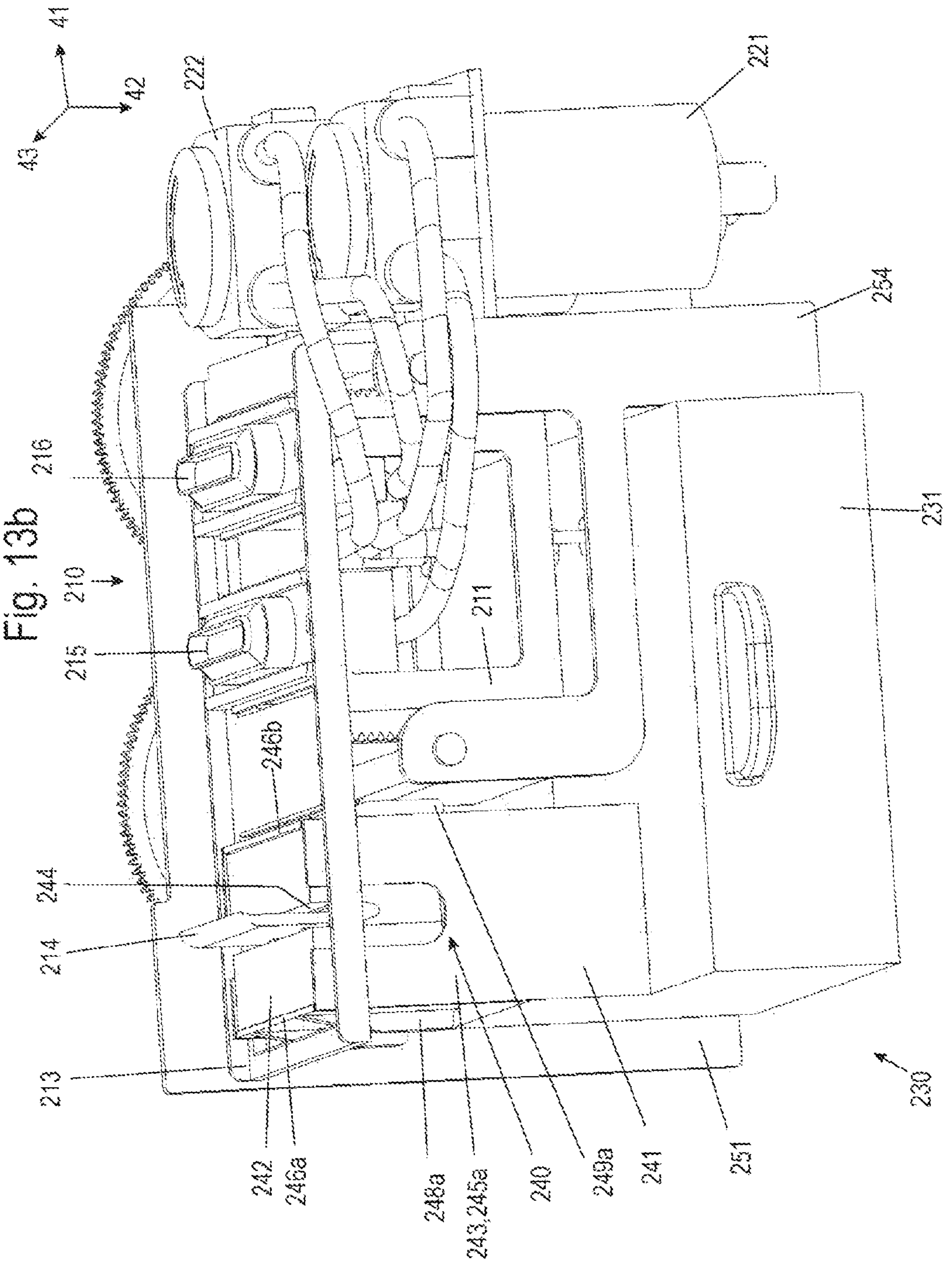
Figure 13C:
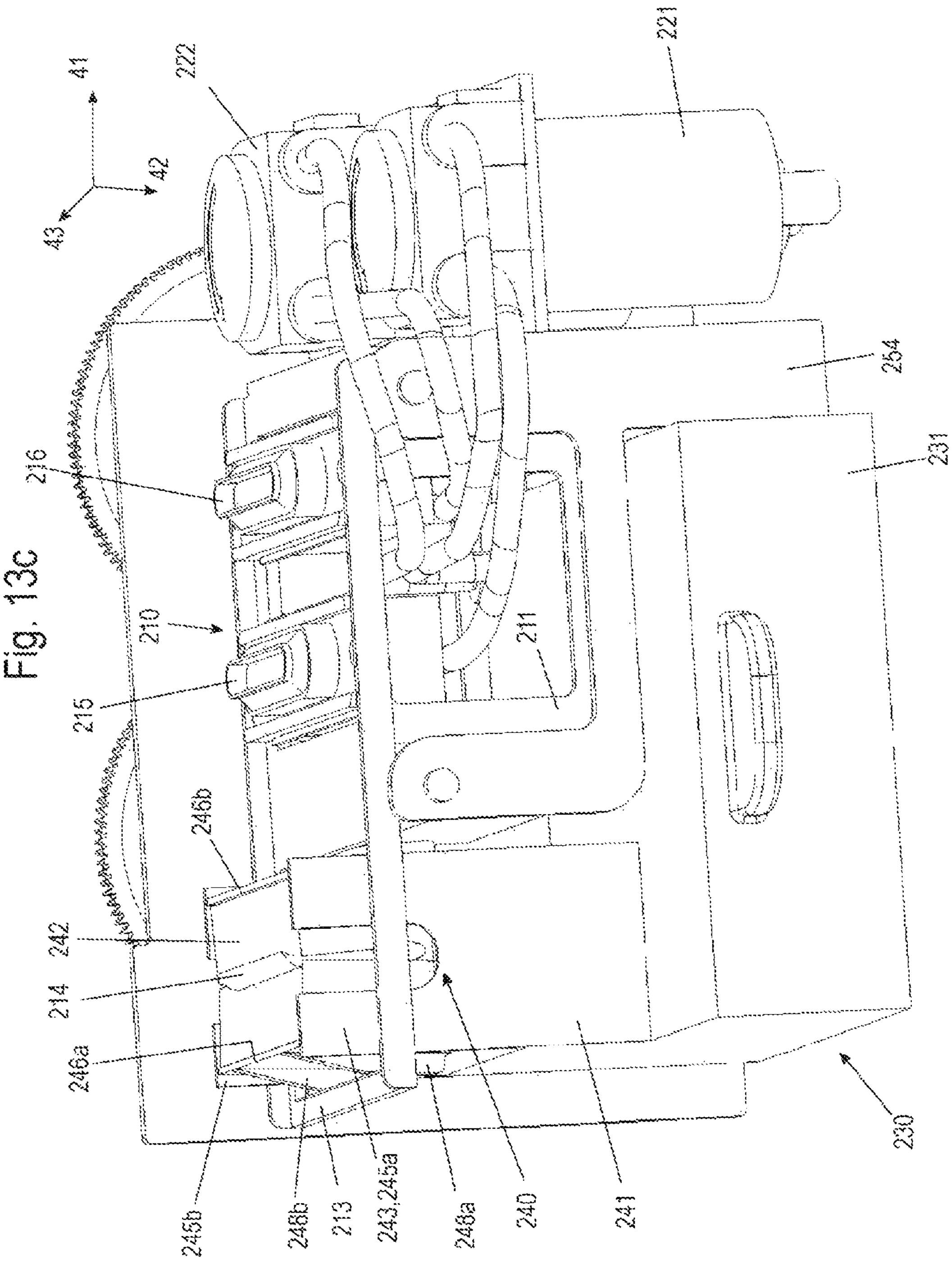
Figure 13D:
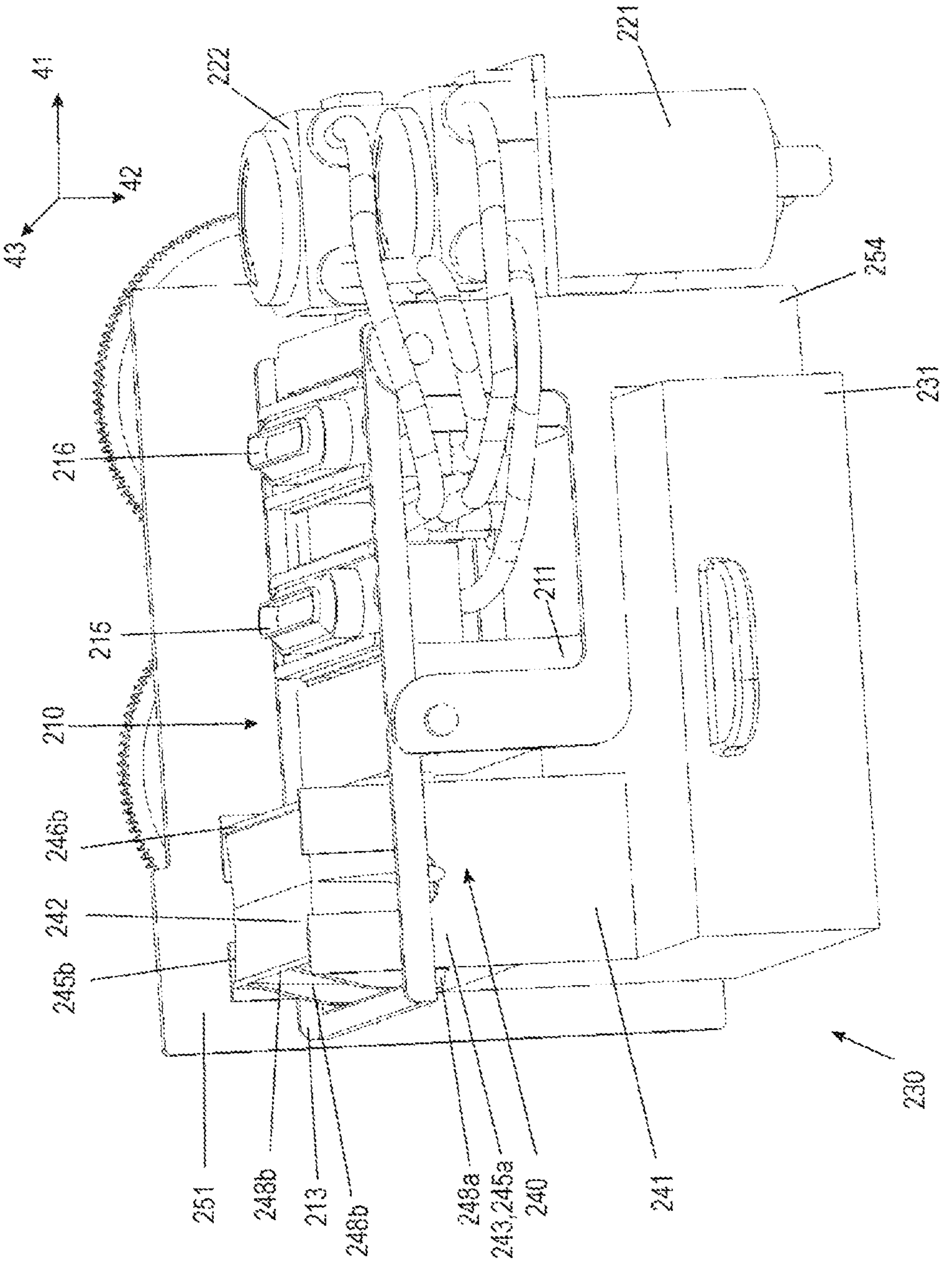

In FIG. 13*d*, the cleansing device 210 is moved to such an extent that the wiping lip 214 dips fully into the receptacle 244 of the sponge 242 and is cleaned as a result. Through the temporally/spatially coordinated dipping, the sponge is not damaged by the frame and only comes into contact with the lip for cleaning.

Figure 5A:
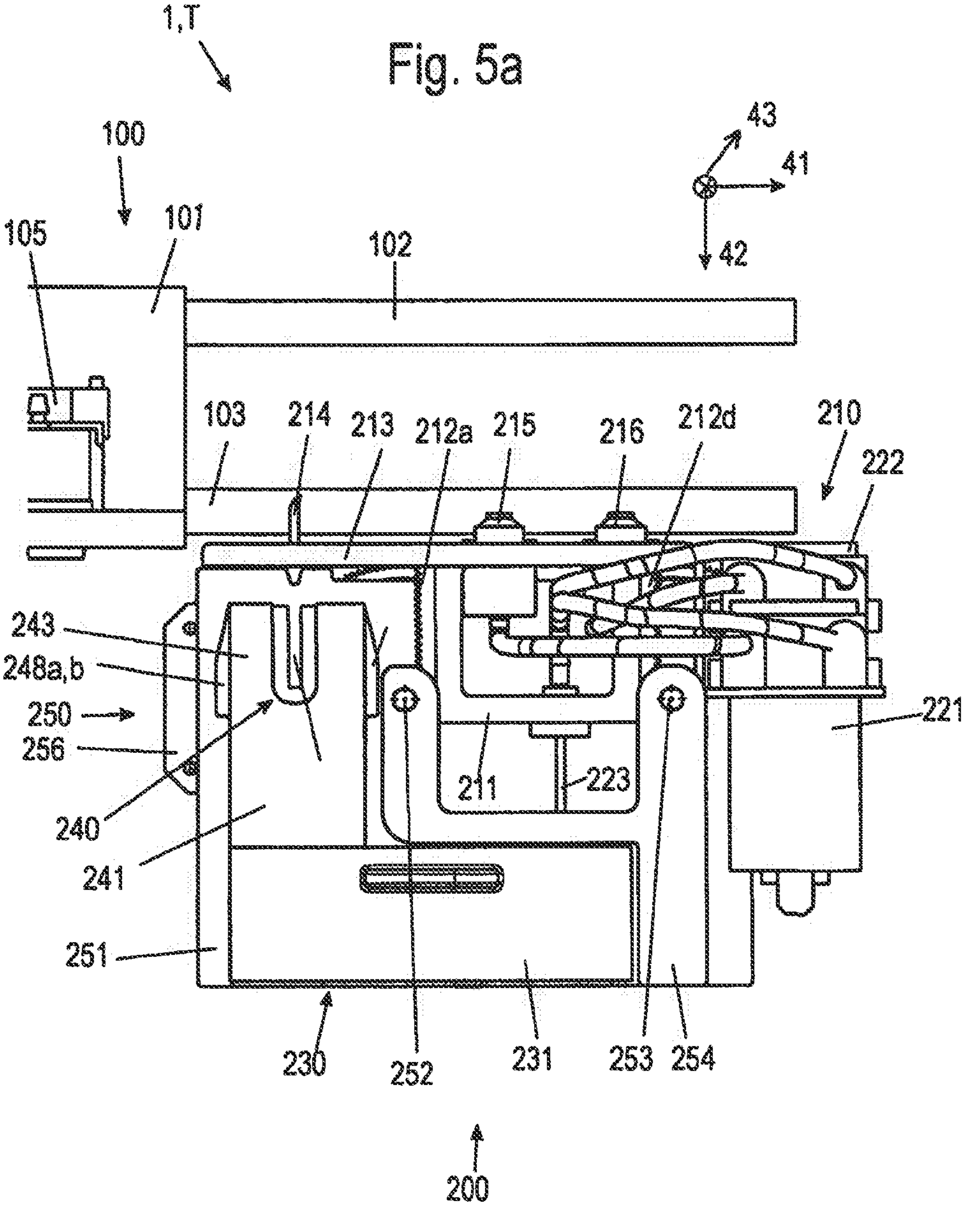
FIGS. 5*a* and 5*b* are partial side and perspective views, respectively, of the printer of FIG. 1 in an exchanging position for exchanging a collecting device of the printer.
Figure 5B:
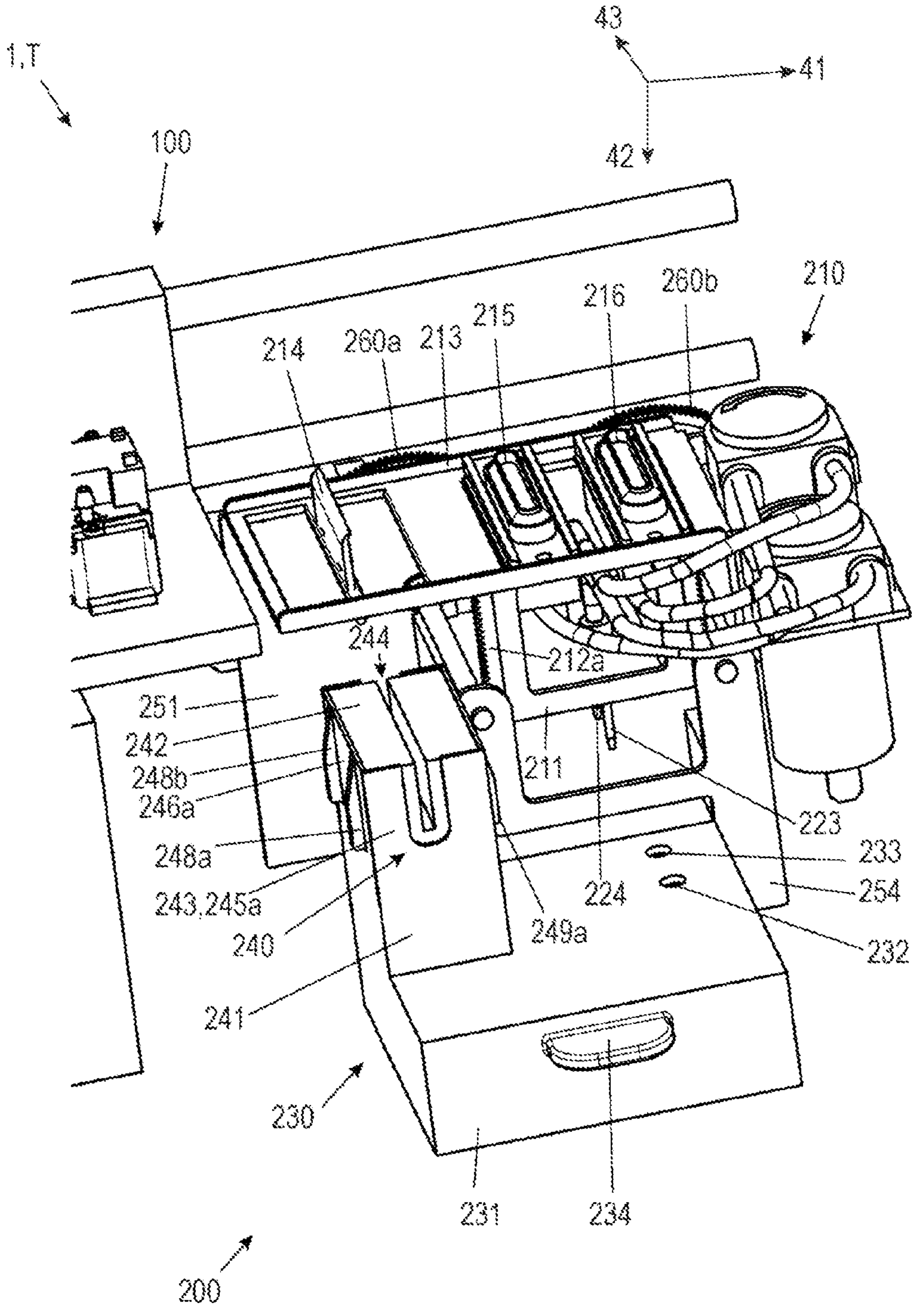

FIGS. 5*a* and 5*b* each show an exchanging position T in which the collecting container can be removed from the printer 1. For this purpose, the printing unit 100 is moved horizontally until it is arranged offset from the cleansing device 210 counter to the horizontal direction 41. The cleansing device 210 is then moved counter to the vertical direction until the wiping lip 214 is fully extended out of the cleaning device 240. The free ends 223, 224 of the second pipes 218, 220 are then arranged in the vertical direction 42 above the collecting container 231 of the collecting device 230. In this exchanging position T, the collecting device 230 can be manually taken out of the printer 1 together with the cleaning device 240 which is affixed to it. A handle 234 is provided on the collecting container 231 for this purpose as shown in FIG. 5*b*.

Exchange of the collecting device 230 can be performed after approximately 2000 to 3000 marker cards 2 have been printed. The specific exchanging interval of the collecting device 230 depends on the volume of ink extracted or wiped off by the cleaning unit 210.

Figure 6A:
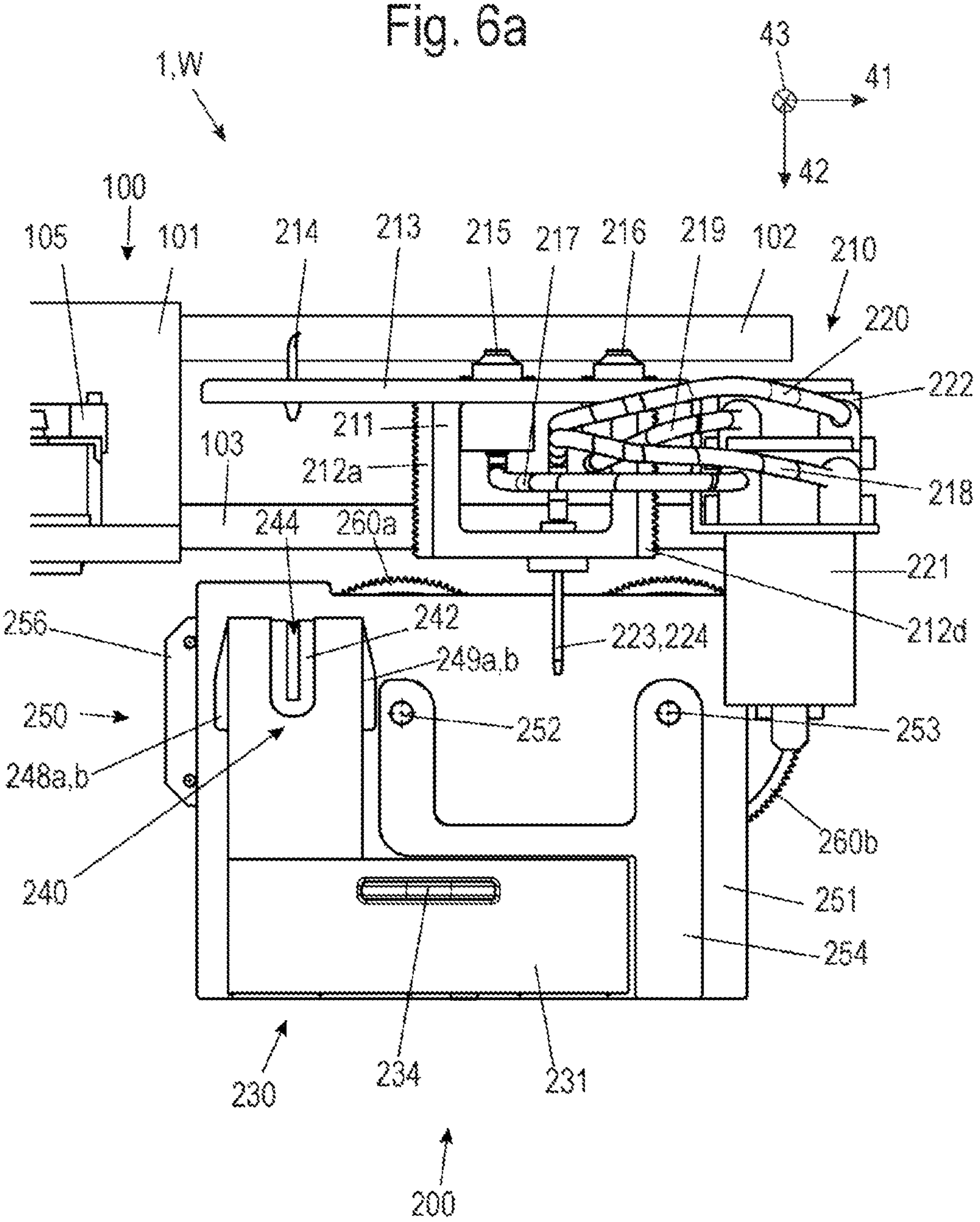
FIGS. 6*a* and 6*b* are partial side and perspective views, respectively, of the printer of FIG. 1 in a servicing position for removing a cleansing device of the printer.
Figure 6B:
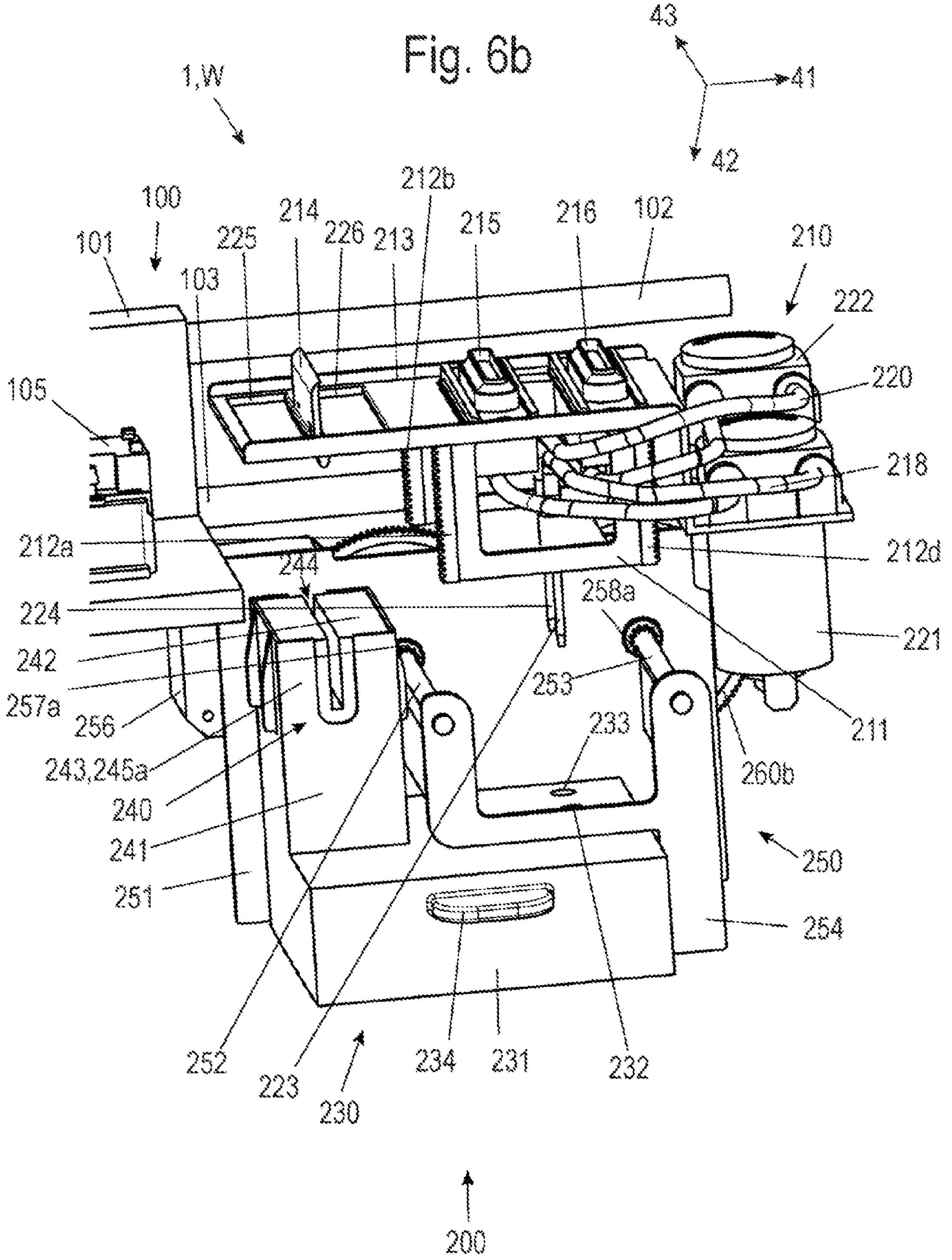

Complete removal of the cleansing device 210 from the printer 1 is depicted in FIG. 6*a* and FIG. 6*b*. For this purpose, the cleansing device 210 is moved counter to the vertical direction 42 until the tooth sections 212*a*-212*d* of the cleansing device 210 are out of engagement with the output pinions 257*a*, 257*b*, 258*a*, and 258*b* of the driving device 250. The cleansing device 210 is then in the servicing position W.

Analogous to the exchanging position T, the printing unit 100 must also be moved horizontally for the servicing position W until it is arranged offset relative to the cleansing device 210 counter to the horizontal direction 41.

Servicing or exchange of the cleansing device 210 may be required after a certain length of operation of the printer such as two to three years. The specific exchanging interval of the cleansing device 210 depends on wear and use.

Figure 7A:
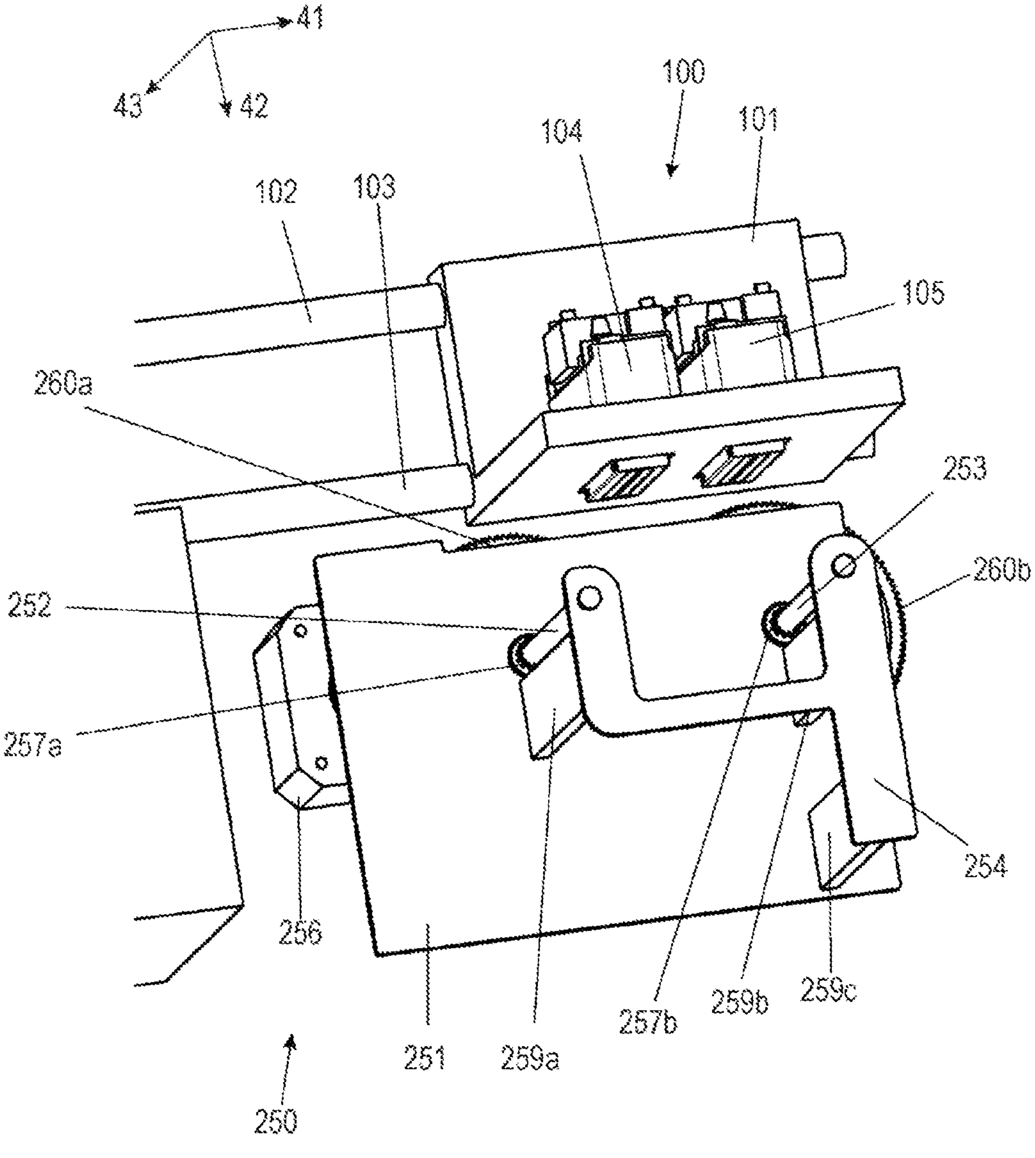
FIG. 7*a* is a perspective view of the printing unit and a driving device for the cleansing device of the printer of FIG. 1.
Figure 8:
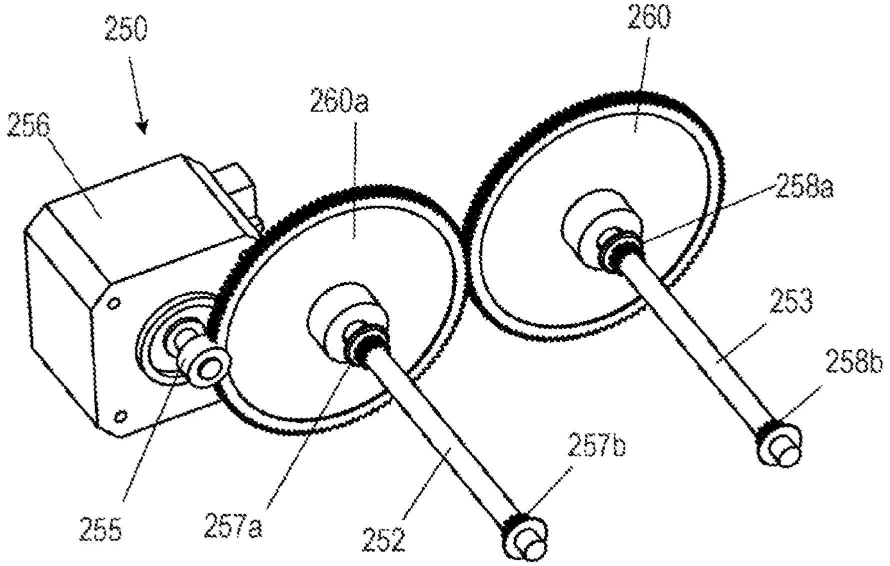
FIG. 8 is a perspective view of the elements of the driving device for the cleansing device of FIG. 7.

FIG. 7*a* shows the driving device 250 and the printing unit 100 in an exemplary position one above the other in the vertical direction and without the cleansing device 210 and the collecting device 230. As a result, it can be seen that the driving device 250 includes two drive shafts 252, 253 which are parallel to one another and which extend in a third spatial direction 43 transverse to the vertical and horizontal directions 42, 41. The output pinions 257*a*, 257*b*, 258*a*, and 258*b* are respectively arranged at opposite ends of the drive shafts 252, 253 to drive the tooth sections 212*a*-212*d* of the cleansing device 210 As also shown in FIG. 8.

The drive shafts 252, 253 are actuated by sprockets 260*a*, 260*b* which are non-rotatably affixed to the drive shafts in an overhung position and which are in engagement with one another. In the process, a first of the two sprockets 260*a*, 260*b* additionally meshes with a driving pinion 255 of a driving motor 256. Therefore, the driving pinion 255 and the two sprockets 260*a* and 260*b* form a reversing gear, since the two sprockets 260*a*, 260*b* rotate in opposite directions when the driving motor 256 is in operation. The driving motor 256 is configured as an electric motor.

The driving device 250 has a base plate 251 in which one end of each of the drive shafts 252, 253 is rotatably borne. Opposite the base plate 251, the driving device 250 furthermore has a bearing shield 254 in which the other end of the drive shafts 252, 253 is rotatably borne. The bearing shield 254 and the base plate 251 are connected to one another by spacer strips 259*a*, 259*b*, 259*c*. They are provided in a stationary manner.

In each case, one output pinion 257*a*, 257*b*, 258*a*, and 258*b*, with the tooth section 212*a*-212*d* which meshes with it, forms a rack-and-pinion gear with all four rack-and-pinion gears running at a synchronous speed and therefore enabling a uniform movement of the cleansing device 210 in and counter to the vertical direction 42.

Figure 7B:
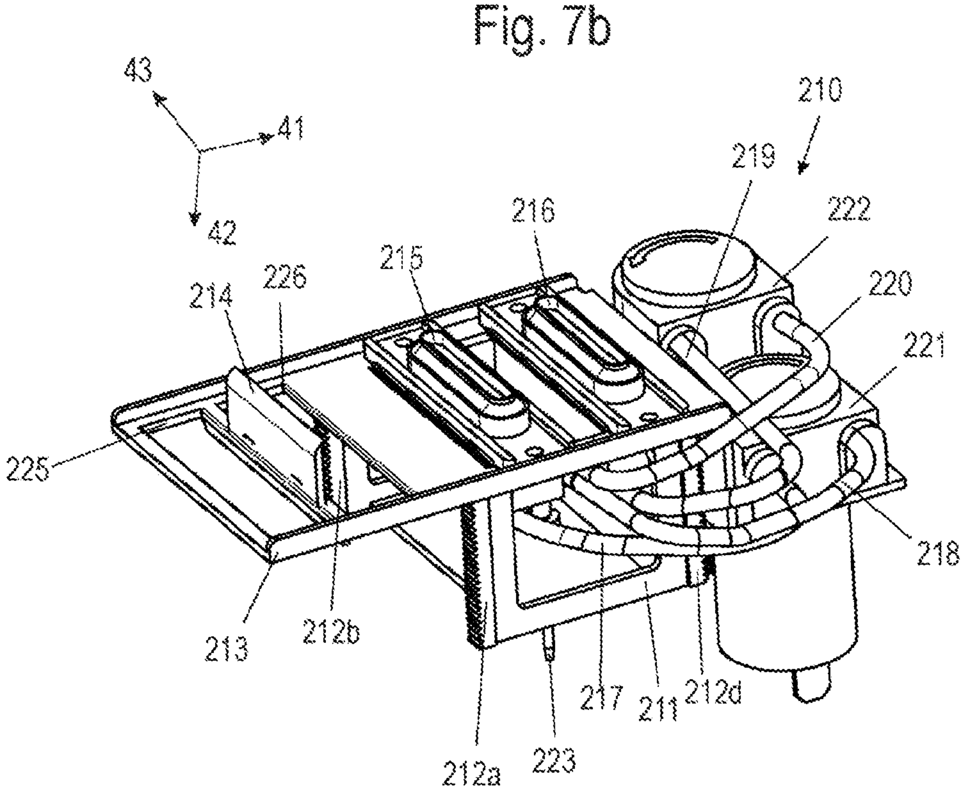
FIG. 7*b* is a perspective view of the cleansing device of the printer of FIG. 1.

The cleansing device 210 is depicted separately in a perspective view in FIG. 7*b*.

FIG. 9 shows the cleaning unit 200 in a three-dimensional view. The cleansing device 210, the collecting device 230, the cleaning device 240 for the wiping lip 214 and the driving device 250 are visible.

Figure 10:
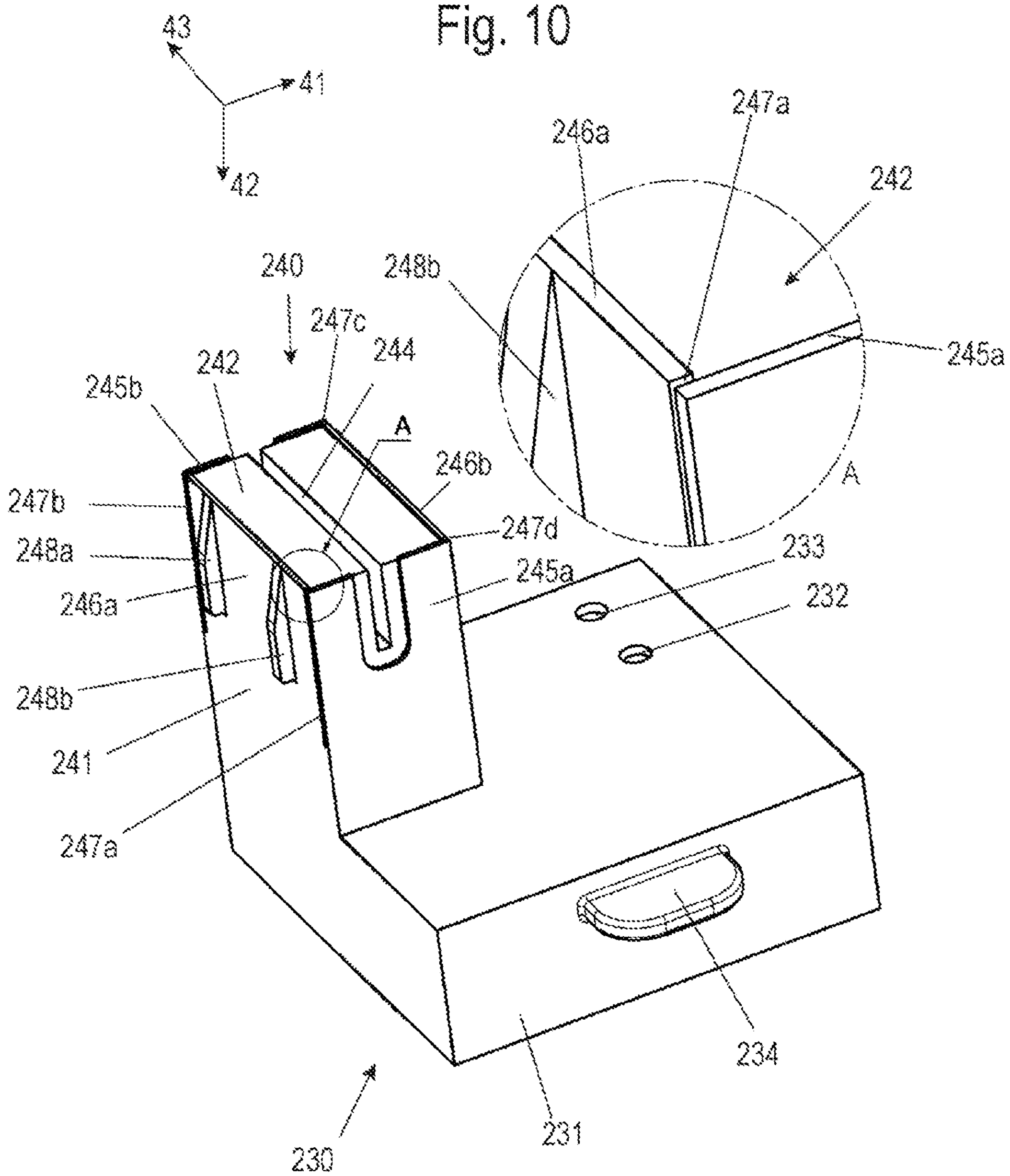
FIG. 10 is a perspective view of the collecting device FIG. 5, with a portion A shown in detail.

The collecting device 230 is depicted in three dimensions in FIG. 10, without adjacent components. Two through holes 232, 233 can be clearly seen into which, when the collecting device 230 is in the installed state, one needle or free end 223, 224, respectively, at the ends of the second pipes 218, 220 of the cleansing device 210 engage. For simple handling of the collecting device 230, a handle 234 can be formed integrally on the collecting container 231. The cleaning unit 240 for the wiping lip 214 is arranged in a rectangular-cuboid-shaped dome-like projection 241 which is formed integrally on the collecting container 231.

The cleaning unit 240 of the wiping lip 214 has a sponge 242 which, by way of example here, has a rectangular-cuboid shape and which is manufactured from a porous or foam-like material. The sponge is inserted into the projection 241. For this purpose, the projection 241 has a shape corresponding to the sponge 242.

In order to be able to receive the wiping lip 214, the receptacle 244 is provided in the center of the sponge 242.

In the region of the sponge 242, the projection 242 includes four walls 245*a*, 245*b*, 246*a*, 246*b* which form an insert 243. At the level of the sponge 242, the walls 246*a*, 246*b* which run parallel to the receptacle 244 are not connected to the walls 245*a*, 245*b* which run transverse to these. On the contrary, one gap 247*a*, 247*b*, 247*c*, 247*d*, respectively, runs between the walls 246*a*, 246*b*, which are parallel to the receptacle, and the transversely running walls 245*a*, 245*b*. This is depicted enlarged in a cutout A in FIG. 10. The gaps 247*a*, 247*b* and 247*c*, 247*d* cause the walls 246*a*, 246*b*, which run parallel to the receptacle 244, to each be movable in and counter to the horizontal direction 41 at least in a limited manner.

The walls 246*a*, 246*b* running parallel to the receptacle 244 each have, at their side which faces away from the receptacle 244, ramp-shaped ribs 248*a*, 248*b* and 249*a*, 249*b*.

The projection 241, or insert 243 with its walls 245*a*, 245*b*, 246*a*, 246*b*, is dimensioned such that it can engage in the openings 225, 226 of the mounting plate 213 when the cleansing device 210 is moved downwards in the vertical direction relative to the collecting device 230. Via the ramp-like ribs 248*a*, 248*b* and 249*a*, 249*b*, the vertical movement of the mounting plate 213 is deflected into a quasi-horizontal movement of the respective walls 246*a*, 246*b* which run parallel to the receptacle 242. In this case, the sponge 242 is pushed onto the wiping lip 214 which dips continuously further into the receptacle 244, and the wiping lip 214 is cleaned with the sponge 242. In the process, ink which adheres to the wiping lip 214 is taken up by the sponge 242 and drains off into the collecting container 231. The sponge does not come into contact with the frame through movement.

The cleaning unit 200 is depicted without the collecting device 230 in FIG. 11. Furthermore, direction arrows which depict the direction of flow of the excess ink during a cleaning process of the first print head 104 are arranged on the pipes 217, 218. In the cleaning process, excess ink is extracted from the first print head 104 by the first suction cup 215 via the first pipes 217 and is conveyed via the second pipe 218 by the free pipe end 223, which is mandrel-like, into the collecting container 231 of the collecting device 230 to which the second pipe 218 is affixed by a connecting piece. In this case, the first pump 221 is actuated in order to extract the ink.

In an analogous manner, the second print head 105 is connected to the second suction cup 216, a first pipe 219 assigned to it, the second pump 222 and a second pipe 220 assigned to it. This second pipe 220 also has a second free pipe end 224 which is mandrel-like and which dips into the collecting container 231 of the collecting device 230 and to which the second pipe 220 is affixed by a connecting piece. The ink in the second print head 105 can therefore be extracted in an analogous manner through the driving of the second pump 222. However, for greater clarity, the first pipe 219 and the second pipe 220, which connect the second suction cup 216 to the second pump 222, are not shown in FIG. 11 but are shown in FIG. 9.

The invention claimed is:

1. A printer for printing print media used for marking electrical appliances, connectors, and cables, comprising (a) a printing unit including at least one print head for inkjet printing the print media, said printing unit being movable in and counter to a conveying direction;

(b) a cleaning unit for cleaning said print head and including (i) a cleansing device for extracting ink from said print head in an extraction direction, said cleansing device including pipes having free ends for delivering extracted ink;

(ii) a collecting device having a collecting container for collecting extracted ink from said cleansing device pipe free ends when said pipe free ends are arranged in said collecting container; and (iii) a driving device for moving the cleansing device into one of a plurality of operating positions including an exchanging position resulting from movement of said cleansing device relative to said collecting device in a direction opposite to said extraction direction, said pipe free ends being automatically removed from said collecting container during movement of said cleansing device to the exchanging position, said collecting device being removable from the printer when said cleansing device is in the exchanging position.

2. A printer for printing print media used for marking electrical appliances, connectors, and cables, comprising (a) a printing unit including at least one print head for inkjet printing the print media, said printing unit being movable in and counter to a conveying direction;

(b) a cleaning unit for cleaning said print head and including (i) a cleansing device for extracting ink from said print head in an extraction direction, said cleansing device comprising a frame including at least one tooth section and including pipes having free ends for delivering extracted ink;

(ii) a collecting device having a collecting container for collecting extracted ink from said cleansing device pipe free ends when said pipe free ends are arranged in said collecting container; and (iii) a driving device for moving the cleansing device into one of a plurality of operating positions, including a servicing position and an exchanging position resulting from movement of said cleansing device relative to said collecting device in a direction opposite to said extraction direction, said pipe free ends being automatically removed from said collecting container during movement of said cleansing device to the exchanging position, said collecting device being removable from the printer when said cleansing device is in the exchanging position, said driving device including at least one output pinion which meshes with said at least one tooth section to move said cleansing device, said tooth section being disengaged from said output pinion when said cleansing device is in said servicing position to completely remove said cleansing device from said collecting device.

3. The printer as defined in claim 2, wherein said at least one tooth section extends linearly in the extraction direction.

4. The printer as defined in claim 3, wherein said at least one tooth section comprises a pair of spaced tooth sections and said at least one output pinion comprises a pair of spaced output pinions.

5. The printer as defined in claim 1, wherein said cleansing device is moved into said servicing position in a direction counter to the conveying direction.

6. The printer as defined in claim 2, wherein said cleansing device comprises a wiping lip for wiping ink from said at least one print head and a suction cup for extracting ink from said at least one print head, said wiping lip and said print head being moved with said cleansing device.

7. The printer as defined in claim 6, and further comprising a mounting plate connected with and extending transversely relative to said frame, said wiping lip and said suction cup being arranged on said mounting plate.

8. The printer as defined in claim 6, wherein said cleansing device includes a pump connected with said suction cup for extracting ink from said suction cup, said pump being moved with said cleansing device.

9. The printer as defined in claim 6, and further comprising a cleaning device arranged on said collecting container for cleaning said wiping lip.

10. The printer as defined in claim 9, wherein said cleaning device for said wiping lip comprises a sponge including a receptacle into which said wiping lip is introduced reversibly during movement of said cleansing device.

11. The printer as defined in claim 10, wherein said sponge is arranged between two adjustable walls, a space between said adjustable walls changing when said wiping lip is introduced into said sponge receptacle to compress said sponge.

12. A cleansing device for a printer as defined in claim 1.

* * * * *